A. O. ABBOTT, Jr.
TIRE.
APPLICATION FILED APR. 20, 1917.

1,271,985.

Patented July 9, 1918.

INVENTOR
ADRIAN O. ABBOTT, JR.
BY
Ralzemond A. Parker
ATTORNEY

UNITED STATES PATENT OFFICE.

ADRIAN O. ABBOTT, JR., OF DETROIT, MICHIGAN, ASSIGNOR OF ONE-HALF TO WILLIAM B. NORTON, OF DETROIT, MICHIGAN.

TIRE.

1,271,985.　　　　　Specification of Letters Patent.　　Patented July 9, 1918.

Application filed April 20, 1917. Serial No. 163,349.

*To all whom it may concern:*

Be it known that I, ADRIAN O. ABBOTT, Jr., a citizen of the United States, residing at Detroit, county of Wayne, State of Michigan, have invented a certain new and useful Improvement in Tires, and declare the following to be a full, clear, and exact description of the same, such as will enable others skilled in the art to which it pertains to make and use the same, reference being had to the accompanying drawings, which form a part of this specification.

This invention relates to a method of building pneumatic tires and to the product of such method. In a pneumatic tire with a fabric carcass it has been the custom to apply the fabric one complete annulus at a time, that is to say, first one strip is completely laid and lapped or spliced together at the end, and then a second strip is completely laid and spliced together at the ends, the second strip being so laid on the tire that the two splices will not come together. In this form of construction the splice is the weakest part of the tire as the short threads of one end lap the short threads of the other end and adhere thereto only by the gum that is in the strip.

In my new method of constructing tires two or more strips are started and wound on the tire simultaneously from different angular positions. This results in each strip being exposed inside or outside for only part of its length, while the other part of its length lies in between two neighboring plies, very much adding to the strength of the carcass by interlocking all the strips securely together.

In the drawings,—

Figure 1:
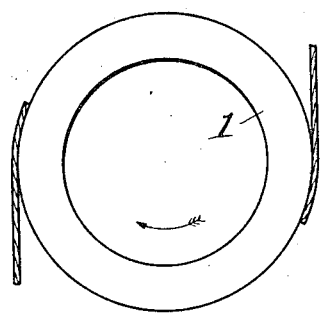
Figure 1 is a diagrammatic view showing how two strips are simultaneously started on the core.
Figure 2:
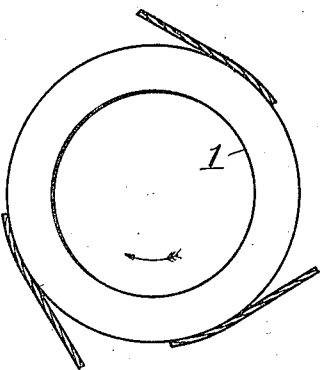
Fig. 2 shows how three strips are simultaneously started on the core.
Figure 3:
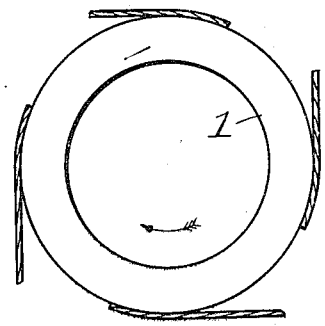
Fig. 3 shows how four strips are simultaneously started on the core.
Figure 4:
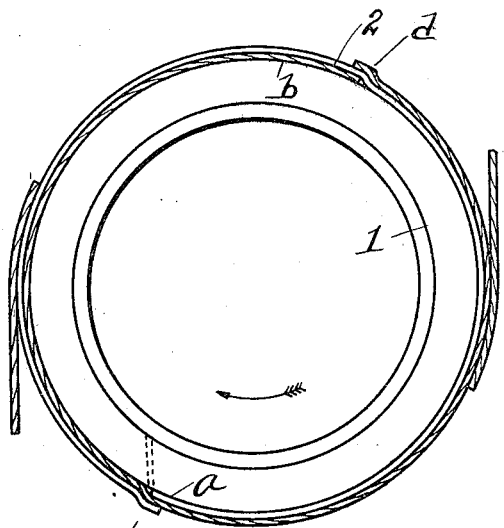
Fig. 4 shows the resultant tire construction where two strips are simultaneously started on the core.

Referring to Fig. 4, it will be seen that the strip $a$, which is shown in full lines, for half the distance around the core, is on the inside, then it passes to the outside of the cross-hatched strip $b$, and finally finishes at $c$, overlapping the beginning end, but it is to be noted that there intervenes between the two overlapping ends the second strip $b$, and that consequently the two overlapped ends adhere to each other through the long threads that occur in the middle portion of the strip $b$ as distinguished from the short threads that occur at the ends of the strip. The ends of the strip have formerly been made to adhere directly together, thereby resulting in a weak spot in the tire at the splice.

In tracing the cross-hatched strip $b$, it will be found that one-half of this is exposed on the inside of the tire and then it passes to the outside of the strip $a$ at the point $c$, and it has the same kind of a spliced joint at the point $d$.

When two more plies are laid on as is shown in Fig. 4, it will be evident that the complete mass of fabric is securely locked together, and instead of one ply being exposed its whole 360 degrees on the inside and one ply exposed its whole 360 degrees on the outside, while the two intervening or one intervening ply adhere to adjacent plies on both sides, we have an entirely different condition. Each strip is exposed one-half of its circumference, in the two-ply simultaneous feed, and each strip lies between two other strips for half of its length, thereby insuring firm locking together of all the strips and a secure carcass. As already alluded to, all the splices are made with an intervening strip between the lapping ends, insuring a much stronger splice.

A further feature of this construction is that the method may be performed very much more rapidly than in the old way as the fabric is laid down twice, three or four times as fast depending upon the number of plies simultaneously applied. And furthermore, the core does not have to be turned around to a given point every time intermediate the applications to insure the splices breaking joints in the tire.

What I claim is:

1. In a tire, a carcass construction involving a spliced joint in which is a strip of fabric wound into an annulus of only slightly greater length than the long circumference of the core and before the annulus is completed over a second strip and lapping its beginning end with the second strip intervening between the two lapped ends.

2. A tire made up in part of a plurality of strips of fabric each of substantially the length of the long circumference of the tire, the strips overlying and underlying each other at different places and each passing between the adjacent ends of the other strip.

3. A tire made up in part of a plurality of strips of fabric each of greater length than the long circumference of the tire, the strips overlying and underlying each other at different places and each passing between the lapped ends of the other strip.

4. In a tire carcass construction, a joint formed by two adjacent ends of a strip of fabric which is wound around the long circumference of the tire, and a second strip of fabric wound around the long circumference of the tire and passing between the adjacent ends of the first strip from a position under the first strip to a position on the outside of the first strip.

In testimony whereof, I sign this specification.

ADRIAN O. ABBOTT, Jr.